United States Patent
Yamamoto

(10) Patent No.: US 11,343,434 B2
(45) Date of Patent: May 24, 2022

(54) IMAGE PROCESSING APPARATUS AND CONTROL METHOD FOR SAME

(71) Applicant: CANON KABUSHIKI KAISHA, Tokyo (JP)

(72) Inventor: Naohiro Yamamoto, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 47 days.

(21) Appl. No.: 16/710,729

(22) Filed: Dec. 11, 2019

(65) Prior Publication Data

US 2020/0204717 A1 Jun. 25, 2020

(30) Foreign Application Priority Data

Dec. 20, 2018 (JP) .............................. JP2018-238650
Nov. 19, 2019 (JP) .............................. JP2019-209005

(51) Int. Cl.
*H04N 5/235* (2006.01)
*G06T 5/50* (2006.01)

(52) U.S. Cl.
CPC ............ *H04N 5/2351* (2013.01); *G06T 5/50* (2013.01); *G06T 2207/10004* (2013.01); *G06T 2207/10048* (2013.01); *G06T 2207/20212* (2013.01)

(58) Field of Classification Search
CPC ................... H04N 5/2351; G06T 5/50; G06T 2207/10004; G06T 2207/10048; G06T 2207/20212

USPC ......................................................... 382/100
See application file for complete search history.

(56) References Cited

U.S. PATENT DOCUMENTS

| 8,269,996 B2 | 9/2012 | Yamamoto |
| 2017/0061663 A1* | 3/2017 | Johnson ................... G06T 7/13 |
| 2019/0045139 A1* | 2/2019 | Kurata ................... H04N 5/232 |

FOREIGN PATENT DOCUMENTS

JP 2017157902 A 9/2017

* cited by examiner

*Primary Examiner* — Michael R Neff
(74) *Attorney, Agent, or Firm* — Carter, DeLuca & Farrell LLP

(57) ABSTRACT

An image processing apparatus, comprises: an image-obtaining unit configured to obtain a visible image and an infrared image; a luminance obtaining unit configured to obtain a luminance of the visible image; a determining unit configured to determine, based on the luminance obtained by the luminance obtaining unit, a combining ratio between the infrared image and the visible image for generating a combined image obtained by combining the infrared image with the visible image; a combining unit configured to combine the infrared image with the visible image based on the combining ratio determined by the determining unit; and a correcting unit configured to correct the combining ratio such that an amount of change in the combining ratio does not exceed a threshold value, in a case where the amount of change in the combining ratio exceeds the threshold value.

9 Claims, 9 Drawing Sheets

IMAGE PROCESSING APPARATUS AND CONTROL METHOD FOR SAME

BACKGROUND OF THE INVENTION

Field of the Invention

The present invention pertains to a technology for combining a visible image with an infrared image.

Description of the Related Art

A system of network cameras is often used for monitoring intruders or intruding objects, for example, in public buildings and locations, banks, stores such as supermarkets, and off-limits areas such as dams, bases, and airfields. For example, image data captured by a network camera is stored on a server via a network, and based on the stored image data, the server analyzes whether an intruding object is present or not. In addition, an imaging apparatus has emerged that includes an infrared light source as well as a visible light source. In this case, an operation is performed that switches between imaging with visible light and imaging with infrared light in accordance with predetermined conditions. For example, based on luminance information of the captured image data, imaging is performed using a visible light source in a case where luminance is higher than a particular value and using an infrared light source in a case where luminance is lower than or equal to the particular value. In general, a visible image captured by the visible light source is obtained as a color image, and an infrared image captured by the infrared light source is obtained as a monochrome image.

Furthermore, a method is available by which a visible image and an infrared image are combined to generate a combined image. For example, a method is known by which a visible image and an infrared image are combined to generate a combined image that is a pseudo-color image (hereinafter referred to as "MIX image"). Additionally, Japanese Patent Laid-Open No. 2017-157902 discloses a technology for combining a visible image with an infrared image to improve image quality of an image in a situation where mist is occurring.

However, in a case where a combining ratio between the visible image and the infrared image is switched when a combined image is generated based on a luminance threshold value, the luminance value may differ significantly between a combined image output before the switching and a combined image output after the switching. Thus, in a case where the luminance of a subject varies around a luminance threshold value, even with an insignificant change in luminance, the combining ratio may change to significantly change the luminance value in the combined image. As a result, in a case where recognition processing is performed based on the combined image, the state of the subject may be misrecognized due to such a change in luminance value. In addition, in a case where a user visually observes the combined image, such a change in luminance value causes the user to have an unpleasant sensation.

SUMMARY OF THE INVENTION

According to one aspect of the present invention, an image processing apparatus, comprises: an image-obtaining unit configured to obtain a visible image and an infrared image; a luminance obtaining unit configured to obtain a luminance of the visible image; a determining unit configured to determine, based on the luminance obtained by the luminance obtaining unit, a combining ratio between the infrared image and the visible image for generating a combined image obtained by combining the infrared image with the visible image; a combining unit configured to combine the infrared image with the visible image based on the combining ratio determined by the determining unit; and a correcting unit configured to correct the combining ratio such that an amount of change in the combining ratio does not exceed a threshold value, in a case where the amount of change in the combining ratio exceeds the threshold value.

According to the present invention, a technology can be provided that allows for generation of more suitable combined images.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Examples of embodiments of the present invention will be described below in detail with reference to the drawings. Note that the following embodiments are merely examples, and the present invention is not limited to the details of the embodiments.

First Embodiment

As a first embodiment of an image processing apparatus according to the present invention, a camera apparatus will be described below as an example which performs imaging the same subject in a visible light region and an infrared light region, combines a visible image with an infrared image obtained by the imaging to obtain a combined image, and distributes the combined image through a network. Note that in the following description, it is assumed that a visual moving image and an infrared moving image are obtained at a prescribed frame rate and that, for an image pair of a visible frame image and an infrared frame image obtained at an identical timing, the image pair are combined and the combined image is distributed. Additionally, in the following description, a configuration in which a pseudo-color image (MIX image) is generated as a combined image will be described, but the present invention can also be applied to a configuration in which a monochrome image is generated.

<Apparatus Configuration>

Figure 1:
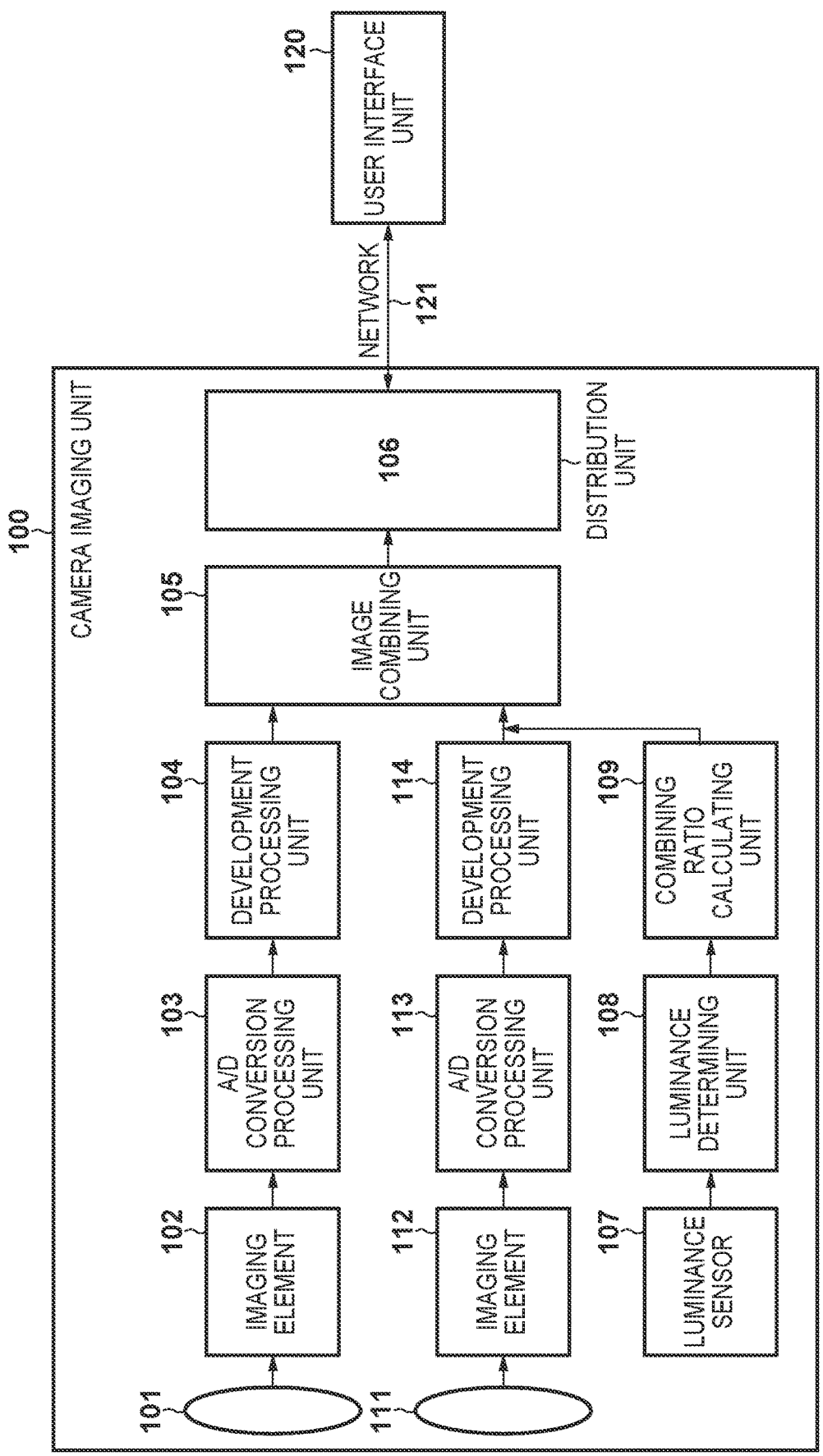
FIG. 1 is a diagram illustrating a configuration of a camera apparatus according to a first embodiment.
Figure 2:
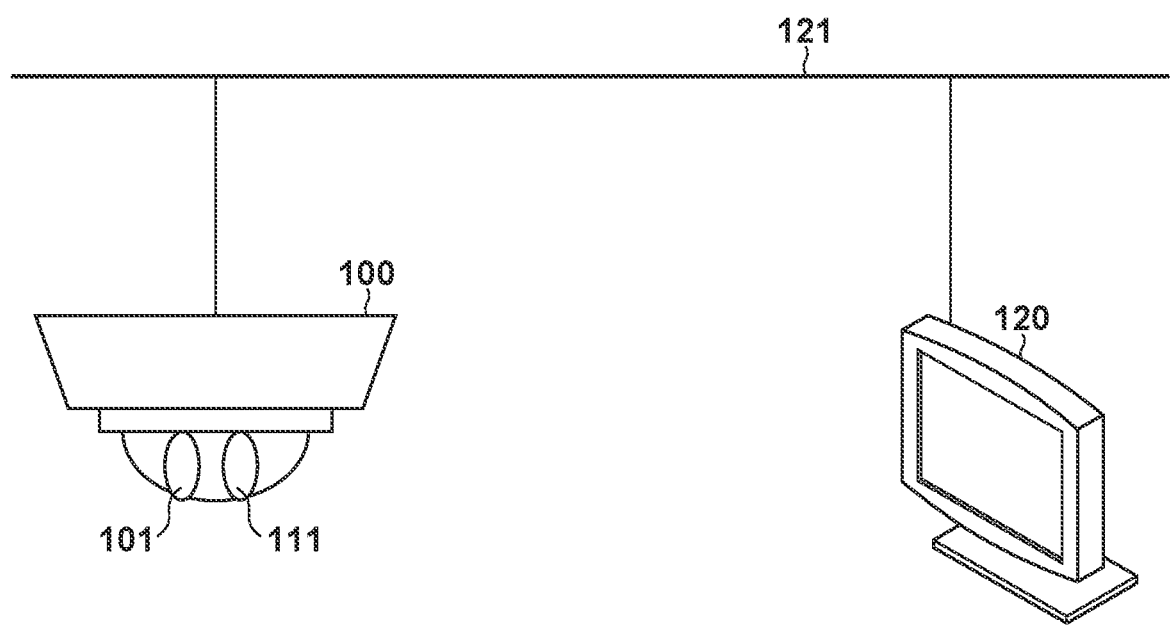
FIG. 2 is an explanatory diagram illustrating an installation configuration of the camera apparatus.

FIG. 1 is a diagram illustrating a configuration of a camera apparatus according to a first embodiment. Additionally, FIG. 2 is a diagram illustrating an installation configuration of the camera apparatus.

A camera apparatus 100 is communicatively connected to a user interface (UI) unit 120 via a network 121. A visual image or an infrared image captured by the camera apparatus 100 or a MIX image that is a combined image generated based on the visual image and the infrared image is sent to the UI unit 120 via the network 121.

The camera apparatus 100 includes a zoom lens 101, an imaging element 102, a A/D conversion processing unit 103, a development processing unit 104, and a zoom lens 111 for infrared imaging, an imaging element 112, a A/D conversion processing unit 113, and a development processing unit 114. Additionally, the camera apparatus 100 includes an image combining unit 105, a distribution unit 106, a luminance sensor 107, a luminance determining unit 108, and a combining ratio calculating unit 109.

In addition to zoom control by the zoom lens 101 and 111, the camera apparatus 100 is configured to be capable of panning/tilting control. Note that the zoom control and the panning/tilting control may physically control an imaging range and an imaging direction by controlling a drive motor or the like or may logically control the imaging range and the imaging direction by image processing. The UI unit 120 transmits a control command for panning, tilting, zooming, or the like to the camera apparatus 100 based on an instruction from a user. The camera apparatus 100 drives drive motors for the zoom lenses 101 and 111 and a holder not illustrated, in accordance with the received control command. For example, in a case where the control command is a zoom instruction, the drive motor for the zoom lens 101 and 111 is driven to be in a photographing range (photographing field angle) indicated by the zoom command.

The zoom lens 101 is constituted by an optical lens that transmits the visible light region, and the imaging element 102 is constituted by an element having sensitivity in the visible light region. Additionally, the zoom lens 111 is constituted by an optical lens that transmits the infrared light region, and the image capturing element 112 is constituted by an element having sensitivity in the infrared light region. The imaging elements 102 and 112, are elements that output electrical signals in accordance with received light intensity, and CCD sensors or CMOS sensors can be utilized as the imaging elements 102 and 112. Note that, in this case, it is assumed that sequential imaging is performed at a predetermined frame rate.

Analog signals output by the imaging elements 102 and 112 are converted into digital signals by the A/D conversion processing units 103 and 113 to generate RAW image data, which is digital data. The development processing units 104 and 114 develop the received RAW image data and generates image data. Here, it is assumed that the development processing unit 104 generates color image data and that the development processing unit 114 generates monochrome image data. For example, a range of 0.1 to 30 frames/sec may be set, but the present invention is not limited to this range.

The image combining unit 105 combines, according to a combining ratio determined by a method described below, a visible image image-obtained from the development processing unit 104 with an infrared image image-obtained from the development processing unit 114 to generate a MIX image. The distribution unit 106 distributes the MIX image generated by the image combining unit 105 to the network 121. Note that the distribution unit 106 may distribute a compressed image into which the MIX image has been compressed in accordance with an instruction from the UI unit 120.

The luminance sensor 107 is a sensor that generates luminance information related to visible light in the periphery of a location where the camera apparatus 100 is installed. Note that instead of installing the luminance sensor 107, luminance information of the visible image may be configured to be generated based on information obtained by the imaging element 102. The luminance determining unit 108 obtains luminance information generated by the luminance sensor 107 (luminance obtaining) and calculates a luminance value to be used for determining the combining ratio. The combining ratio calculating unit 109 calculates the combining ratio based on the luminance value calculated by the luminance determining unit 108.

Figure 3:
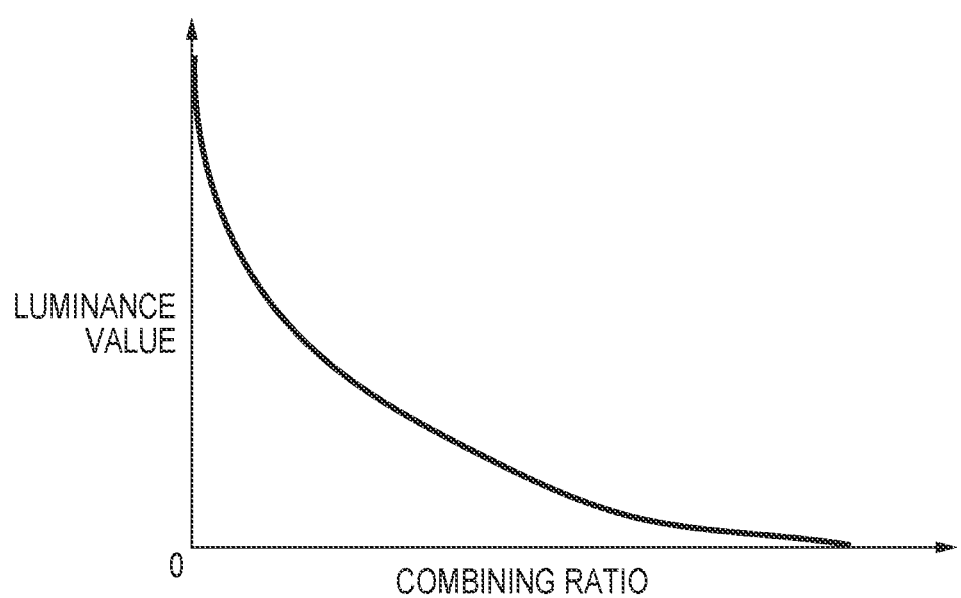
FIG. 3 is a diagram illustrating a relationship between a luminance value and a combining ratio.

FIG. 3 is a diagram illustrating a relationship between the luminance value and the combining ratio (characteristic graph). The horizontal axis indicates the combining ratio in image combining (the rate of the infrared image in the combined image), and the vertical axis indicates the luminance value of the visible image. A higher luminance value of the visible image is considered to reflect a brighter subject (photographing range) and corresponds to image combining with a higher ratio of the visible image (lower combining ratio value). In the illustrated relationship, the combining ratio changes continuously in accordance with a change in luminance value. The combining ratio calculating unit 109 determines the value of the combining ratio based on the characteristic graph in FIG. 3, with respect to the luminance value determined by the luminance determining unit 108. The image combining unit 105 combines the visible image with the infrared image based on the determined value of the combining ratio to generate a MIX image.

Note that the combining ratio of the infrared image to the combined image at a luminance value corresponding to switching from visual image distribution to combined image distribution (or vice versa) may be set to 0 (zero) % (that is, 100% visible image) to achieve a continuous change during the switching. Additionally, the combining ratio of the infrared image to the combined image at a luminance value corresponding to switching from infrared image distribution to combined image distribution (or vice versa) may be set to 100% (that is, 0% visible image) to achieve a continuous change during the switching. Furthermore, a change rate of the combining ratio at a relatively low luminance (right side in FIG. 3) may be set lower than a change rate of the combining ratio at a relatively high luminance (left side in FIG. 3).

<Operation of Apparatus>

Figure 4:
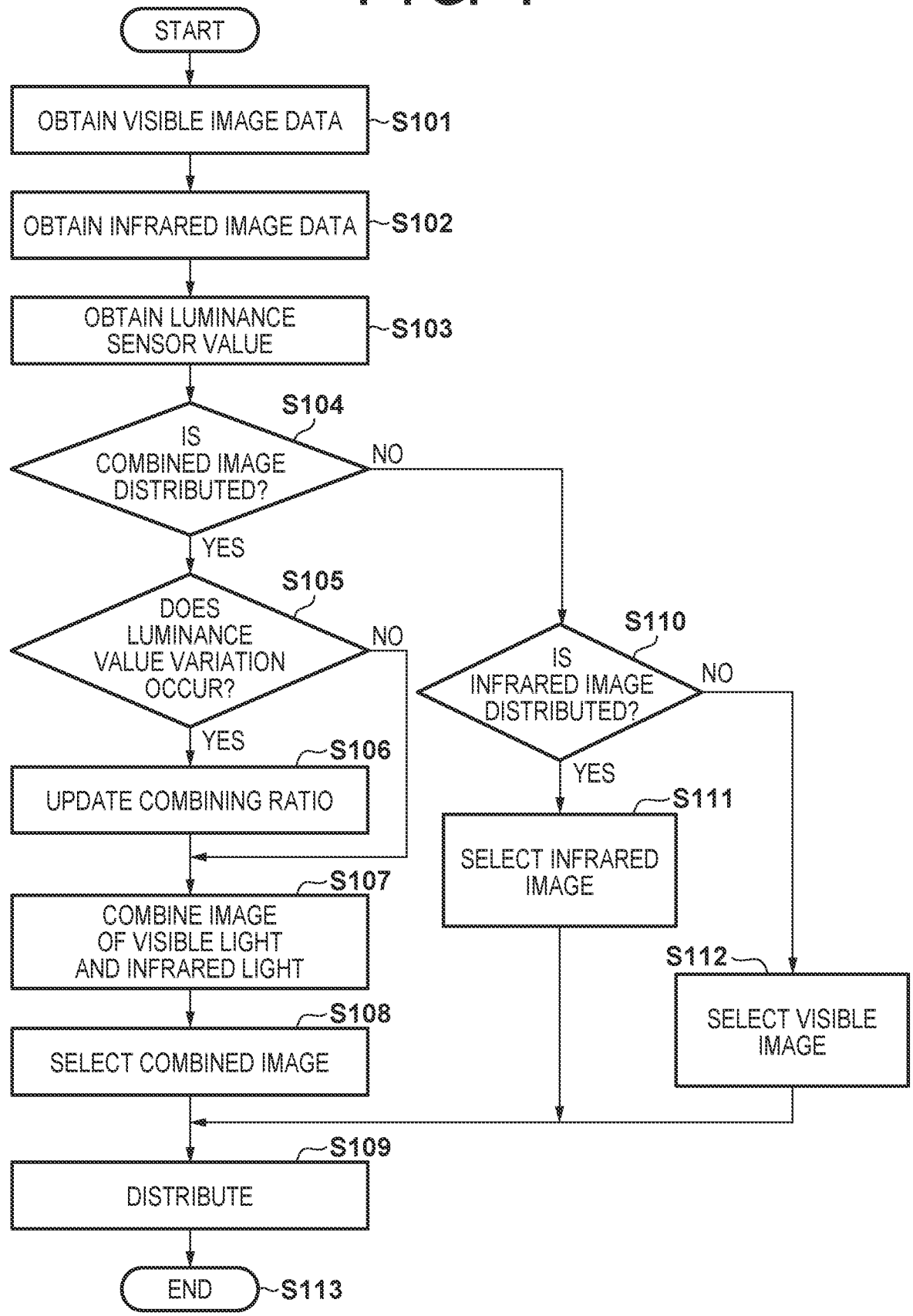
FIG. 4 is a flow chart illustrating overall operations of the camera apparatus.

FIG. 4 is a flow chart illustrating overall operations of the camera apparatus. More specifically, FIG. 4 illustrates the operations of the camera apparatus 100 performed after a visible image and an infrared image are obtained and before a MIX image is distributed. Note that the following description pertains to a frame image of interest (a pair of a visible image and an infrared image) at a certain timing but that the operations are performed on each frame image captured by the imaging element 102 and 112.

The image combining unit 105 obtains visible light image data at S101 and obtains infrared light image data at S102. At S103, the luminance determining unit 108 obtains data from the luminance sensor 107 to obtain a luminance value.

At S104, the image combining unit 105 determines whether or not to distribute a combined image in accordance with the type of distributed image specified in advance by the UI unit 120. In a case of the determination that a combined image is to be distributed, the processing proceeds to S105, and in a case of the determination that no combined image is to be distributed (i.e., the infrared image or the visible image is to be distributed), the processing proceeds to S110.

At S110, the image combining unit 105 determines whether or not to distribute the infrared image. In a case of the determination that the infrared image is to be distributed, then the processing proceeds to S111, and in a case of the determination that no infrared image is to be distributed (i.e., the visible image is to be distributed), the processing proceeds to S112. At S111, the image combining unit 105 selects the infrared image and outputs the infrared image to the distribution unit 106. On the other hand, at S112, the image combining unit 105 selects the visible image and outputs the visual image to the distribution unit 106.

At S105, the luminance determining unit 108 determines whether a temporal change in luminance value (luminance value variation) has occurred. In a case where a luminance value variation has occurred, the processing proceeds to S106, and in a case where no luminance value variation has occurred, the processing proceeds to S107. At S106, the combining ratio calculating unit 109 updates the combining ratio. Details of the update of the combining ratio will be described below with reference to FIG. 5. At S107, the image combining unit 105 combines the infrared image with the visible image according to the determined combining ratio, to generate a MIX image which is a combined image. At S108, the image combining unit 105 selects the generated combined image and outputs the combined image to the distribution unit 106.

At S109, the distribution unit 106 distributes, to the network 121, the image selected at one of S108, S111, and S112 and received from the image combining unit 105.

Figure 5:
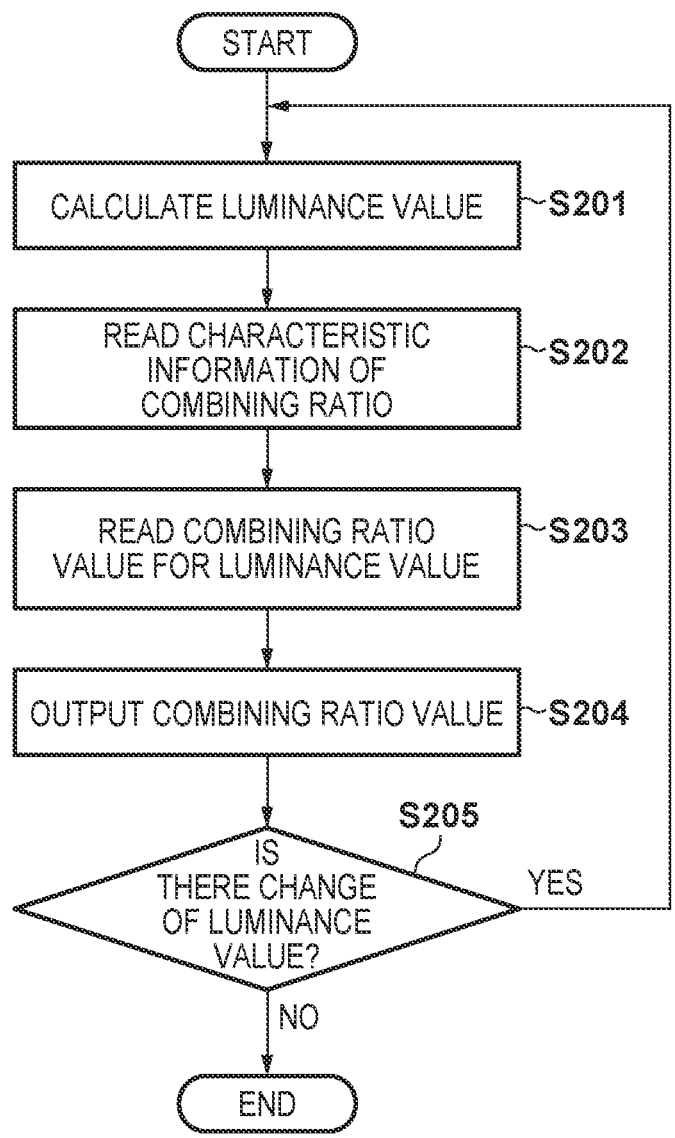
FIG. 5 is a detailed flow chart illustrating processing for updating the combining ratio.

FIG. 5 is a detailed flow chart illustrating combining ratio update processing (S106). Specifically, FIG. 5 illustrates processing for updating (calculating) the combining ratio used for generating a MIX image, the processing being executed by the combining ratio calculating unit 109. Note that the update processing may be configured to be executed synchronously with the overall operations illustrated in FIG. 4 or independently of the overall operations in FIG. 4.

At S201, the luminance determining unit 108 calculates the luminance value. At S202, the combining ratio calculating unit 109 obtains characteristic information indicating a relationship between the luminance value and the combining ratio (e.g., characteristic graph illustrated in FIG. 3). The characteristic information may be configured to be stored in advance in a storage unit within the camera apparatus 100 or to be obtained from the UI unit 120 or any other apparatus.

At S203, the combining ratio calculating unit 109 determines the value of the combining ratio for the luminance value based on the characteristic information read at S202. At S204, the combining ratio calculating unit 109 outputs, to the image combining unit 105, the value of the combining ratio determined at S203.

At S205, the luminance determining unit 108 determines whether an update notification of the luminance information from the luminance sensor 107 has been provided. In a case where an update has been made, the processing transitions to S201, which is then executed again. In a case where no update has been made, the processing ends.

As described above, by continuously varying the combining ratio in accordance with the luminance in the periphery of the location where the camera apparatus 100 is installed, operations can be prevented in which the luminance values in the combined image changes significantly in spite of an insignificant change in luminance. That is, an appropriate MIX image can be generated and output.

Incidentally, in a case of a rapid change in luminance value, the combining ratio may also change rapidly. Thus, the combining ratio for a frame image of interest (a pair of images of interest) is further corrected in accordance with the change rate of the luminance value at the timing when the frame image of interest is obtained. Specifically, in a case of a change in luminance value, a threshold value is provided for the luminance value variation in accordance with the time corresponding to the change in luminance value to prevent a rapid change in combining ratio.

Figure 6:
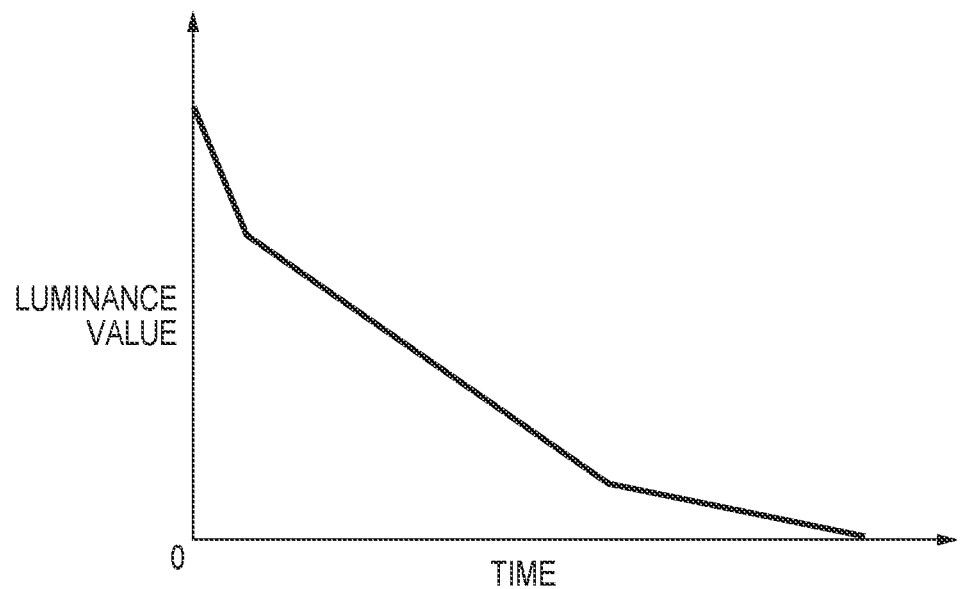
FIG. 6 is a diagram illustrating a relationship between a threshold value for the luminance value and time.

FIG. 6 is a diagram illustrating a relationship between a threshold value for the luminance value and time. The luminance determining unit 108 corrects the luminance value indicated by the threshold value in a case where a luminance change of the luminance value larger than or equal to the threshold value is generated as illustrated in FIG. 6.

Figure 7:
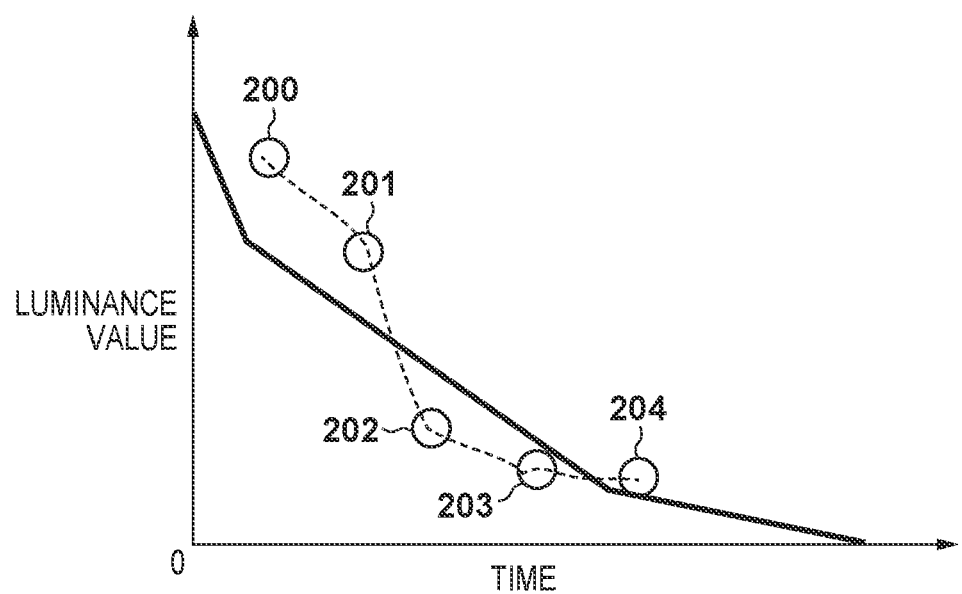
FIG. 7 is a diagram illustrating an example of a change in luminance value over time.

FIG. 7 is a diagram illustrating an example of a change in luminance value over time. Specifically, FIG. 7 is a plot of an example of a temporal transition of the luminance value detected by the luminance sensor 107. Markers 200, 201, 202, 203, and 204 expressed as circles are a plot of the luminance value at five consecutive timings. The temporal change at the marker 202, of the five markers, is smaller than a threshold value. In this case, the luminance determining unit 108 corrects the marker 202 according to the inclination information of the threshold value.

Figure 8:
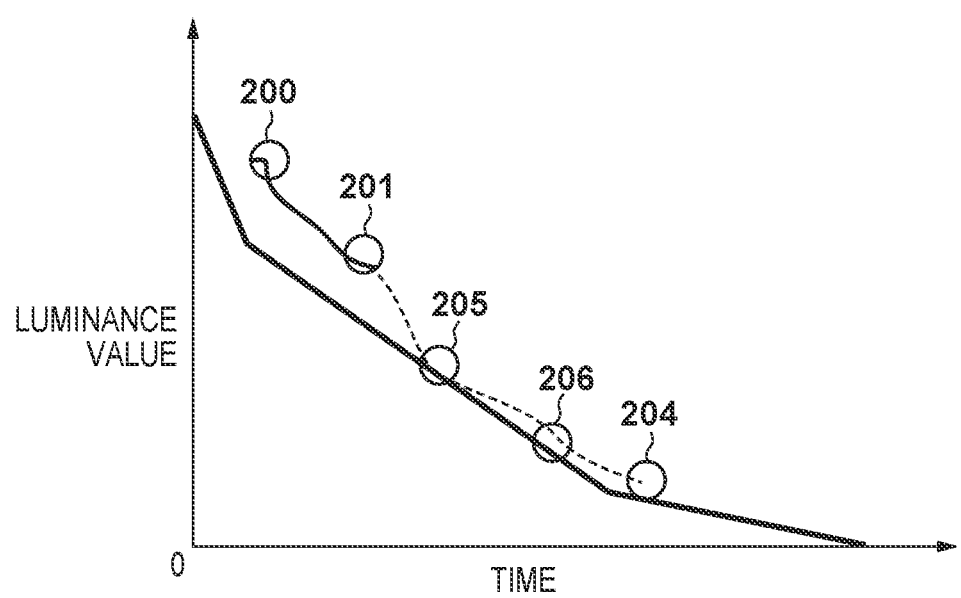
FIG. 8 is a diagram illustrating an example of results of correction of the change in luminance value illustrated in FIG. 7.

FIG. 8 is a diagram illustrating an example of the results of correction of the luminance value changes illustrated in FIG. 7. The correction of the marker 202 in FIG. 7 results in a marker 205 in FIG. 8. Additionally, since the position of the marker 202 has been corrected to the position of the marker 205, the temporal change at the markers 203 with respect to the corrected markers 202 is smaller than the threshold value. Thus, the position of the marker 203 is also corrected to the position of a marker 206 in FIG. 8.

Figure 9:
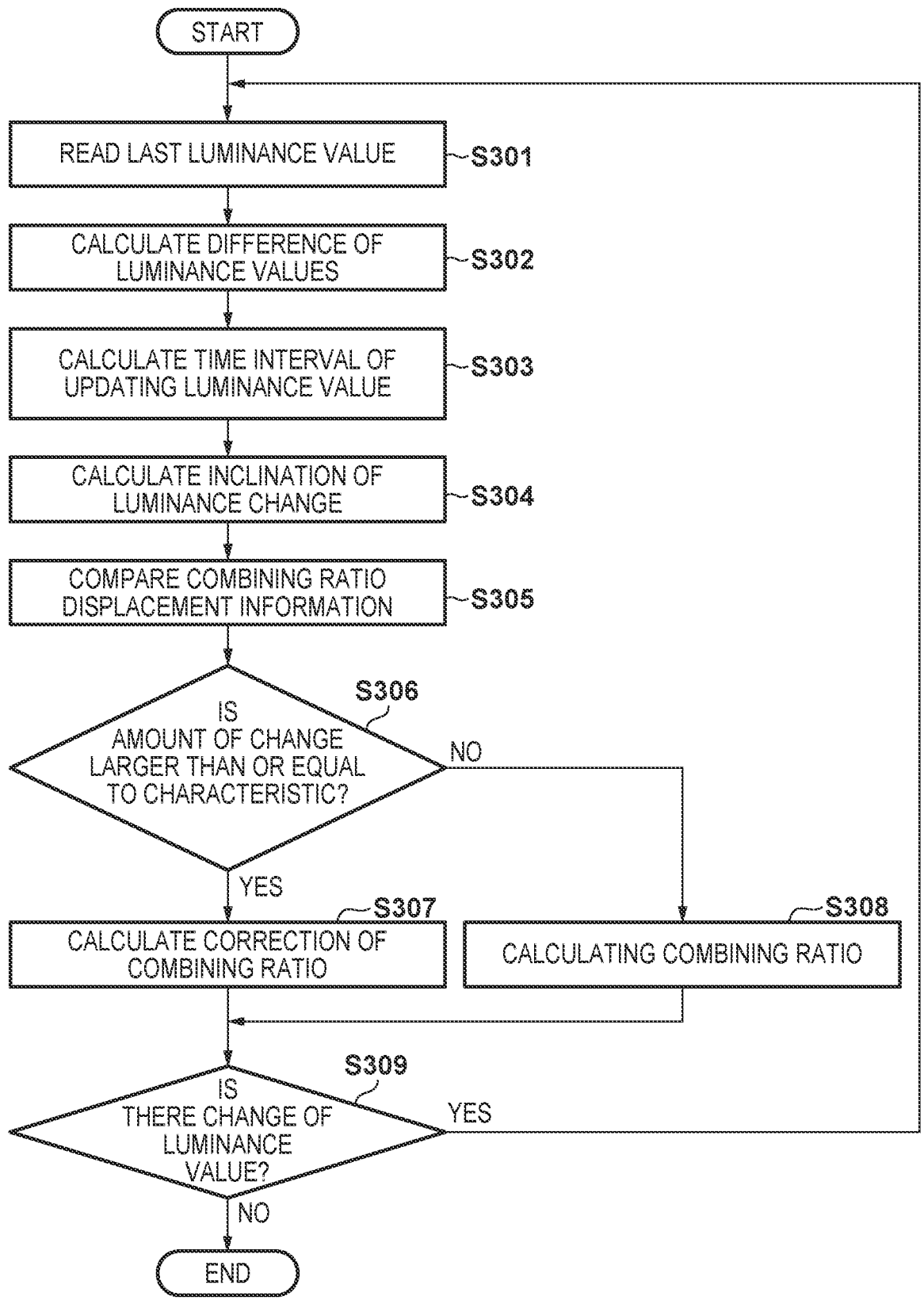
FIG. 9 is a detailed flow chart illustrating processing for correcting the combining ratio according to the first embodiment.

FIG. 9 is a detailed flow chart illustrating processing for correcting the combining ratio according to the first embodiment. Specifically, FIG. 9 illustrates processing for correcting (calculating) the combining ratio in accordance with luminance changes, the processing being executed by the luminance determining unit 108 and the combining ratio calculating unit 109 Note that the correction processing is assumed to be executed at prescribed time intervals. Additionally, the correction processing may be configured to be executed synchronously with the update processing illustrated in FIG. 5 or independently of the update processing in FIG. 5.

At S301, the luminance determining unit 108 reads the last read luminance value corresponding to the image pair preceding the image pair of interest. Note that the last read luminance value is recorded in a recording medium and that the luminance determining unit 108 reads the last luminance value from the recording medium. At S302, the luminance determining unit 108 obtains the current luminance value from the luminance sensor 107 and calculates a difference between the current luminance value and the last luminance value read at S301. At S303, the luminance determining unit 108 calculates time intervals at which the luminance value is obtained from the luminance sensor 107.

At S304, the luminance determining unit 108 calculates the value of the inclination (change rate), which is the amount of change in luminance value over time, from the difference in luminance value calculated at S302 and from the value of the time intervals calculated at S303. At S305, the combining ratio calculating unit 109 calculates the amount of change in combining ratio with respect to the value of the inclination calculated at S304, for example, based on the characteristic graph illustrated in FIG. 3.

At S306, the combining ratio calculating unit 109 compares the amount of change in the combining ratio calculated at S305 with the characteristic graph of the combining ratio and determines whether or not the amount of change exceeds a threshold value regulated by the characteristic graph. In a case where the amount of change exceeds the threshold value regulated by the characteristic graph, then the processing proceeds to S307, and in a case where the amount of change does not exceed the threshold value regulated by the characteristic graph, then the processing proceeds to S308.

At S307, the combining ratio calculating unit 109 determines that the combining ratio has changed rapidly and corrects the combining ratio. In other words, as illustrated in FIGS. 7 and 8, the combining ratio calculating unit 109 performs the correction such that the combining ratio varies slowly. On the other hand, at S308, the combining ratio calculating unit 109 determines that the combining ratio has varied slowly and calculates the combining ratio in accordance with the characteristic graph.

At S309, the luminance determining unit 108 determines whether an update notification of the luminance information from the luminance sensor 107 has been provided, and in a case where an update has been made, the processing transitions to S301, which is then executed again.

The processing described above enables suppression of a rapid variation in combining ratio in a case of a rapid change in luminance value.

As described above, according to the first embodiment, the combining ratio of the combined image of video, captured by the imaging apparatus including two light sources of infrared light and visible light, is controlled in accordance with the luminance value. As a result, even when luminance variation occurs during photographing, a combined image can be output in which misrecognition of the state of the subject and the unpleasant sensation of the user are mitigated.

Second Embodiment

In a second embodiment, another configuration for processing of calculating the combining ratio for a rapid change in luminance will be described. The apparatus configuration and the overall operations are the same as those in the first embodiment, and thus descriptions thereof will be omitted.

Hereinafter, differences from the first embodiment (FIGS. 7 to 9) will be mainly described below.

<Operations of Apparatus>

Figure 10:
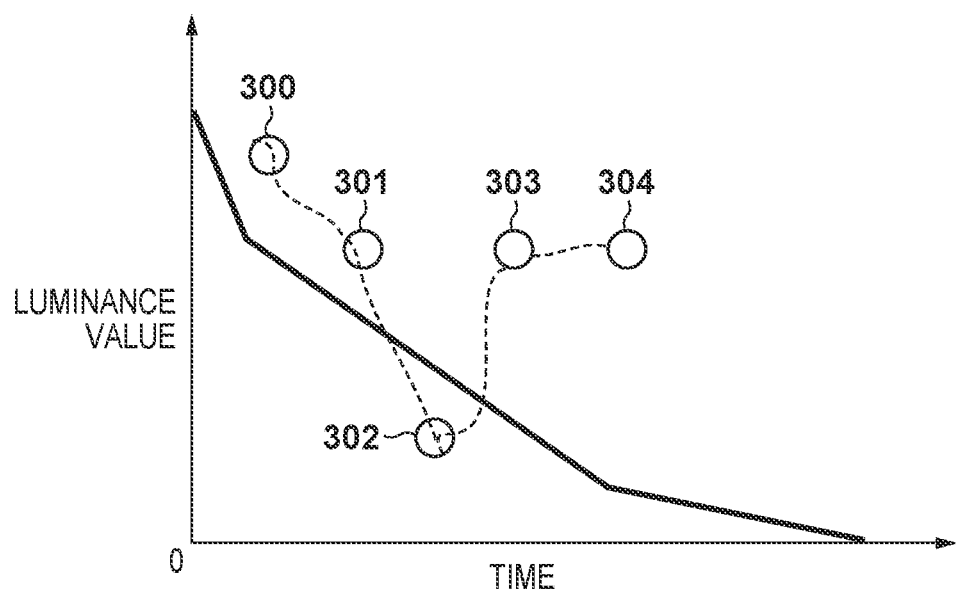
FIG. 10 is a diagram illustrating another example of a change in luminance value over time.

FIG. 10 is a diagram illustrating another example of a change in luminance value over time. Specifically, FIG. 10 is a plot of an example of a temporal transition of the luminance value detected by the luminance sensor 107. Markers 300, 301, 302, 303, and 304 expressed as circles are a plot of the luminance value at five consecutive timings. The temporal change at the marker 302, of the five markers, is smaller than a threshold value. In particular, the markers 301 and 303, respectively preceding and following the marker 302, exhibit approximately the same luminance value, but the luminance value exhibited by the marker 302 rapidly decreases. In this case, the luminance determining unit 108 corrects the marker 302 according to the inclination information of the threshold value.

Figure 11:
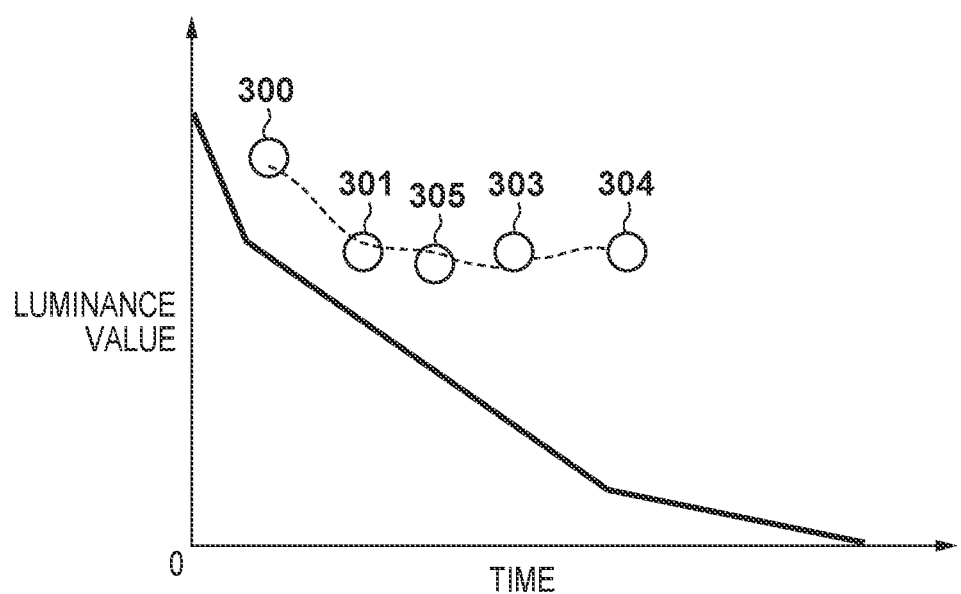
FIG. 11 is a diagram illustrating an example of results of correction of the change in luminance value illustrated in FIG. 10.

FIG. 11 is a diagram illustrating an example of results of correction of the luminance value changes illustrated in FIG. 10. Correction of the marker 302 in FIG. 10 results in a marker 305 in FIG. 11. In this regard, the marker 302 is determined to be the only timing of a rapid change and is corrected to the luminance values of the marker 305 according to the luminance values of the markers 301 and 303, respectively preceding and following the marker 302.

Figure 12:
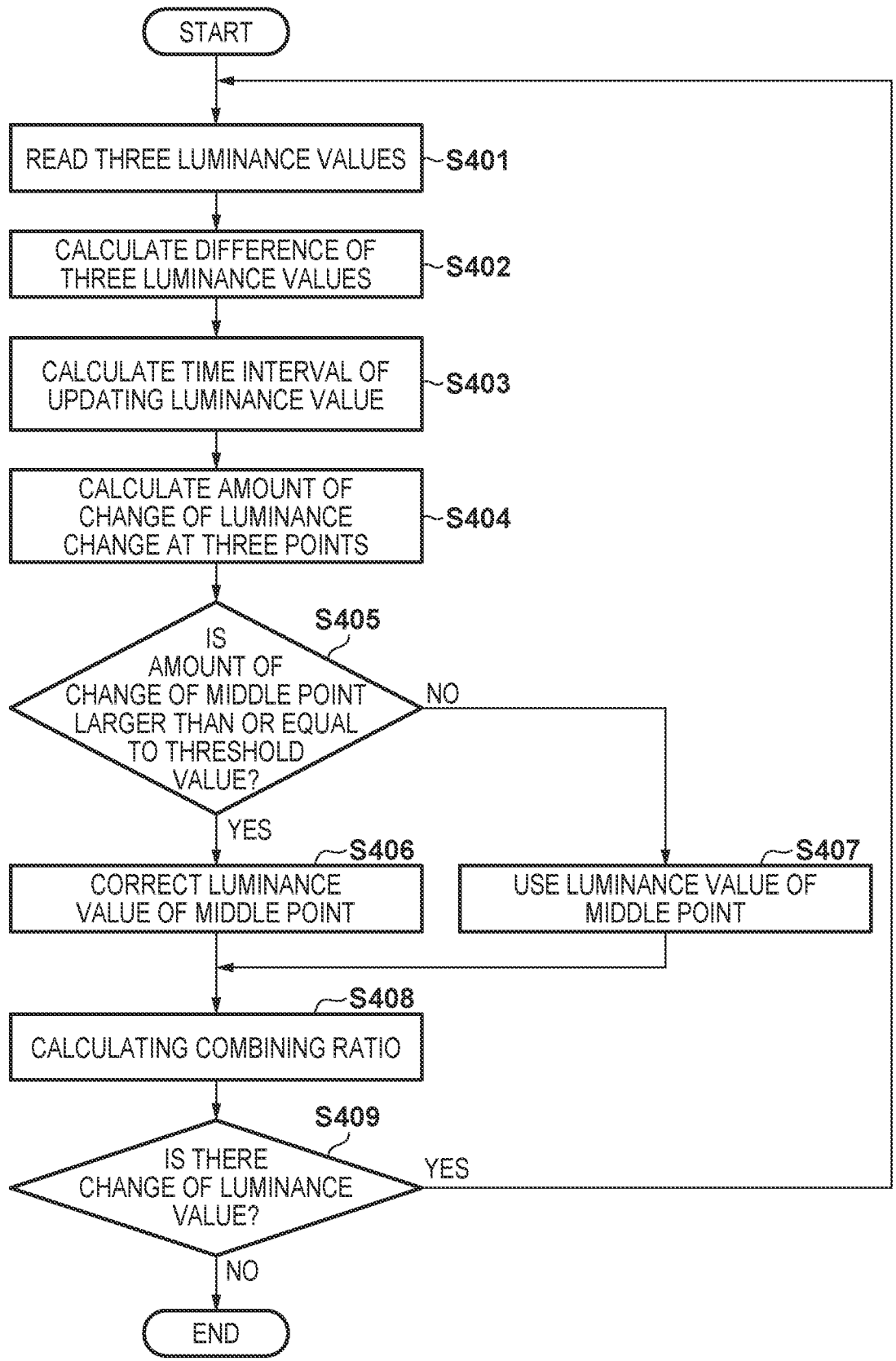
FIG. 12 is a detailed flow chart illustrating processing for correcting the combining ratio according to a second embodiment.

FIG. 12 is a detailed flow chart illustrating processing for correcting the combining ratio according to the second embodiment. Specifically, FIG. 12 illustrates processing for correcting (calculating) the combining ratio in accordance with luminance changes, the processing being executed by the luminance determining unit 108 and the combining ratio calculating unit 109.

At S401, the luminance determining unit 108 reads a luminance value corresponding to an image pair of interest to be evaluated and reads luminance values corresponding to image pairs respectively before and after the image pair of interest (preceding and following image pairs). For example, in a case where the evaluation target is the luminance value of the marker 302, the luminance values at timings of three points corresponding to the markers 301 to 303 are read.

At S402, the luminance determining unit 108 calculates a difference between the luminance value of the evaluation target and each of the luminance values obtained at timings preceding and following the evaluation target, all the luminance values having been read at S401. At S403, the luminance determining unit 108 calculates the time intervals between the luminance values read at S401. For example, in the example illustrated in FIG. 10, the luminance determining unit 108 calculates the time intervals at which the luminance values of the markers 301, 302, and 303 are obtained.

At S404, the luminance determining unit 108 calculates the amount of change (inclination or change rate) over time for the luminance values preceding and following the luminance value to be evaluated, from the luminance differences calculated at S402 and from the time intervals calculated at S403. This allows determination of the state of change of the luminance value of the intermediate marker 302, of the three luminance values. In particular, it can be determined whether or not the intermediate marker 302 undergoes a rapid temporary change with respect to surroundings of the intermediate marker 302.

At S405, the luminance determining unit 108 determines whether or not the change rate (amount of change) of the intermediately located luminance value is larger than or equal to a threshold value. In the example illustrated in FIG. 10, the luminance determining unit 108 calculates a first rate of luminance change between the marker 301 and the marker 302, a second rate of luminance change between the marker 302 and the marker 303, and a third rate of luminance change between the marker 301 and the marker 303. Then, the luminance determining unit 108 determines whether or not the luminance value of the marker 302 is larger than or equal to the threshold value. For example, in a case where the third rate of luminance change is lower than the first rate of luminance change and the third rate of luminance change is lower than the second rate of luminance change, the luminance determining unit 108 determines that the luminance of the intermediately located marker 302 reflects a rapid temporary change, and the processing proceeds to S406. In a case where the luminance of the intermediately located marker 302 is determined to be lower than the threshold value, the processing proceeds to S407.

At S406, the luminance determining unit 108 corrects the intermediately located luminance value according to the threshold value. For example, the marker 302 in FIG. 10 is corrected to the position of the marker 305 in FIG. 11. That is, the luminance value of the marker 302 is corrected so that both the first rate of luminance change and the second rate of luminance change are lower than the threshold value. On the other hand, at S407, the luminance determining unit 108 does not correct the intermediately located luminance value. At S408, the combining ratio calculating unit 109 calculates the combining ratio according to the characteristic graph based on the luminance values determined at S406 and S407.

At S409, the luminance determining unit 108 determines whether an update notification of the luminance information from the luminance sensor 107 has been provided, and in a case where an update has been made, the processing proceeds to S401, which is then executed again.

The processing described above enables suppression of a rapid variation in combining ratio in a case where the luminance value temporarily rapidly changes.

As described above, according to the second embodiment, the combining ratio of the combined image of video, captured by the imaging apparatus including two light sources of infrared light and visible light, is controlled in accordance with the luminance value. Thus, even when the luminance temporarily varies during photographing, a combined image can be output which misrecognition of the state of the subject and the unpleasant sensation of the user are mitigated.

(Modification)

In the embodiments described above, the example has been described in which the combining ratio of the combined image is indirectly controlled in accordance with the luminance value. However, the combining ratio can be directly controlled. For example, in a case where the combining ratio rapidly changes and the change is temporary, the combining ratio obtained after the rapid change is corrected based on the data related to temporal changes in combining ratio before the rapid change occurs. Specifically, the combining ratio is corrected by extrapolating and complementing predicted data of the combining ratio after the rapid change based on the data related to temporal changes in combining ratio before the rapid change; and adjusting the combining ratio close to the predicted data. In this regard, whether the change in combining ratio is rapid or not is determined depending on whether the amount of change in combining ratio is larger than or equal to a predetermined value (threshold value). Additionally, whether the change in combining ratio is temporary or not is determined depending on whether the duration of the state in which the amount of change in combining ratio is larger than or equal to the predetermined value (threshold) is shorter than a predetermined time. The processing described above enables suppression of a rapid variation in the combining ratio in a case where luminance value temporarily rapidly changes.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-238650, filed Dec. 20, 2018 and Japanese Patent Application No. 2019-209005, filed Nov. 19, 2019 which are hereby incorporated by reference herein in their entirety.

What is claimed is:

1. An image processing apparatus, comprising:
   at least one processor; and
   a memory that is coupled to the at least one processor and stores one or more computer-readable instructions, wherein the computer-readable instructions cause, when executed by the at least one processor, the at least one processor to function as:
   an image-obtaining unit configured to obtain a visible image and an infrared image;
   a luminance obtaining unit configured to obtain a luminance of the visible image;
   a determining unit configured to determine, based on the luminance obtained by the luminance obtaining unit, a combining ratio between the infrared image and the visible image for generating a combined image obtained by combining the infrared image with the visible image;

a combining unit configured to combine the infrared image with the visible image based on the combining ratio determined by the determining unit; and a correcting unit configured to correct the determined combining ratio such that an amount of change in the corrected combining ratio does not exceed a threshold value, in a case where the amount of change in the determined combining ratio exceeds the threshold value, wherein the correcting unit corrects the obtained luminance such that an amount of change in the corrected luminance does not exceed a threshold value in a case where the amount of change in the obtained luminance exceeds the threshold value, and the determining unit determines the combining ratio based on the corrected luminance.

2. The image processing apparatus according to claim 1, wherein the determining unit determines the combining ratio such that an amount of change at a relatively low luminance is smaller than an amount of change at a relatively high luminance.

3. The image processing apparatus according to claim 1, wherein the determining unit determines the combining ratio such that a ratio of the infrared image to the combined image decreases with an increase in the corrected luminance.

4. The image processing apparatus according to claim 1, wherein the luminance obtaining unit sequentially obtains a first luminance, a second luminance, and a third luminance, the determining unit calculates a first amount of luminance change between the first luminance and the second luminance and calculates a second amount of luminance change between the second luminance and the third luminance, and the correcting unit corrects the second luminance based on the first amount of luminance change and the second amount of luminance change.

5. The image processing apparatus according to claim 4, wherein the determining unit calculates a third amount of luminance change between the first luminance and the third luminance, and the correcting unit corrects the second luminance in a case where the third amount of luminance change is smaller than the first amount of luminance change and smaller than the second amount of luminance change.

6. The image processing apparatus according to claim 1, wherein the computer-readable instructions further cause the at least one processor to function as:

an information generating unit configured to generate the luminance to be obtained by the luminance obtaining unit based on an output of a luminance sensor installed in a periphery of the image processing apparatus.

7. A control method for an image processing apparatus combining a visible image with an infrared image, comprising:

image-obtaining the visible image and the infrared image;

obtaining a luminance of the visible image;

determining, based on the luminance obtained in the obtaining the luminance, a combining ratio between the infrared image and the visible image for generating a combined image obtained by combining the infrared image with the visible image;

combining the infrared image with the visible image based on the combining ratio determined in the determining; and correcting the determined combining ratio such that an amount of change in the corrected combining ratio does not exceed a threshold value, in a case where the amount of change in the determined combining ratio exceeds the threshold value, wherein in the correcting, the obtained luminance is corrected such that an amount of change in the corrected luminance does not exceed a threshold value in a case where the amount of change in the obtained luminance exceeds the threshold value, and in the determining, the combining ratio is determined based on the corrected luminance.

8. The control method of claim 7, wherein in the determining, the combining ratio is determined such that an amount of change at a relatively low luminance is smaller than an amount of change at a relatively high luminance.

9. A non-transitory computer-readable recording medium storing a program that causes a computer to function as an image processing apparatus, comprising:

an image-obtaining unit configured to obtain a visible image and an infrared image;

a luminance obtaining unit configured to obtain a luminance of the visible image;

a determining unit configured to determine, based on the luminance obtained by the luminance obtaining unit, a combining ratio between the infrared image and the visible image for generating a combined image obtained by combining the infrared image with the visible image;

a combining unit configured to combine the infrared image with the visible image based on the combining ratio determined by the determining unit; and a correcting unit configured to correct the determined combining ratio such that an amount of change in the corrected combining ratio does not exceed a threshold value, in a case where the amount of change in the determined combining ratio exceeds the threshold value, wherein the correcting unit corrects the obtained luminance such that an amount of change in the corrected luminance does not exceed a threshold value in a case where the amount of change in the obtained luminance exceeds the threshold value, and the determining unit determines the combining ratio based on the corrected luminance.

* * * * *